UNITED STATES PATENT OFFICE.

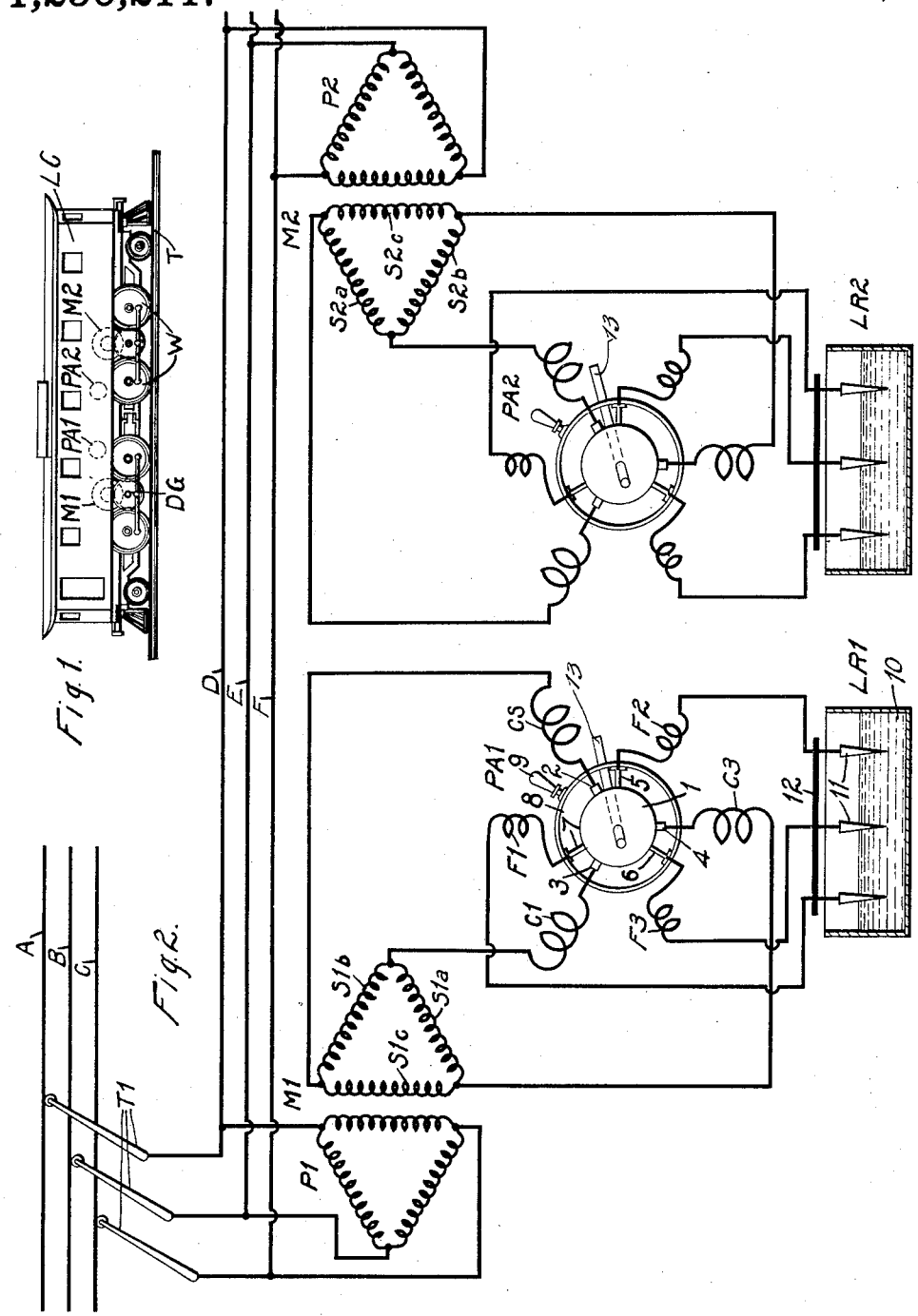

STANLEY G. NOTTAGE, OF WILKINSBURG, PENNSYLVANIA, ASSIGNOR TO WESTINGHOUSE ELECTRIC AND MANUFACTURING COMPANY, A CORPORATION OF PENNSYLVANIA.

CONTROL SYSTEM.

1,250,211.  Specification of Letters Patent.  Patented Dec. 18, 1917.

Application filed October 9, 1915. Serial No. 54,944.

*To all whom it may concern:*

Be it known that I, STANLEY G. NOTTAGE, a subject of the King of England, and a resident of Wilkinsburg, in the county of Allegheny and State of Pennsylvania, have invented a new and useful Improvement in Control Systems, of which the following is a specification.

My invention relates to systems of control for dynamo-electric machines, and it has special reference to the speed and phase regulation of induction motors and systems of distribution.

The object of my invention is to provide a system of the above-indicated character which shall be effective and reliable in operation and which shall embody, in relatively simple and compact form, means for regulating the speed and the phase adjustment of induction motors and the like.

As is well-known to those skilled in the art, when a phase-advancer is employed in connection with the speed and power-factor regulation of an induction motor, if the regulation is to be carried above normal running speed, which is usually three or four per cent. below synchronous speed, the phase of the corrective voltage impressed upon the secondary winding of the induction motor must differ by 180° from the phase of the voltage impressed upon the secondary windings when the motor is to be operated at a speed below the above-mentioned normal speed. Similarly, if the induction machine is to be regulated above its normal regenerating speed, which is generally three or four per cent. above synchronous speed, the phase of the corrective voltage in question must also vary by 180° from the phase of the voltage employed when the regenerating machine is to be operated below the normal regenerating speed. In this way, the phase-advancer voltage either boosts or bucks the secondary-winding voltage of the induction machine to effect the desired result.

In addition, when the induction machine is operating to return energy to the supply circuit, the connections of two of the phase conductors must be interchanged, with many types of apparatus, or the direction of rotation of the phase-advancer must be reversed, for well-known reasons.

Moreover, the regulation of the power-factor relations in the induction motor secondary winding requires the impression thereon of a voltage from the phase-advancing machine that is at right angles to the voltage of the secondary winding itself, in accordance with the familiar operation of the Leblanc phase-advancer, for instance. In other words, when an induction motor is adapted for speed or slip regulation during either motor or regenerating operation, such as usually occurs on electrified railroads having relatively heavy grades, a continuous range of the phase of the voltage delivered by the phase-advancer machine through 180 degrees is required. One method of effecting the desired object is to vary the space position of the magnetic poles created in the phase-advancing machine, as shown and described in a co-pending application of F. W. Meyer, Serial No. 653,380, filed October 7, 1911, and assigned to the Westinghouse Electric & Manufacturing Company.

According to my present invention, however, I provide a system for accomplishing the ends in view without varying the space position of the magnetic poles. I employ a phase-advancing machine having an armature winding and a commutator cylinder associated therewith in the usual manner, a set of stationary brushes that are connected through compensating field-magnet windings to the induction motor secondary windings, and a set of movable brushes that may be actuated through an angle of 180 degrees to vary the field excitation of the phase-advancing machine and to effect a corresponding and desired variation of the magnitude and phase angle of the voltage impressed upon the induction motor secondary windings.

In the accompanying drawing, Figure 1 is a diagrammatic view of an electric locomotive embodying a propulsion equipment that is arranged in accordance with my invention; and Fig. 2 is a diagrammatic view of a system of control embodying my invention.

In locomotives embodying two or more motors or sets of driving motors that are associated with the respective trucks of the locomotive, it is well known that more or less difficulty is sometimes experienced by reason of the unequal division of load between the sets that is caused by a difference in the diameters of the various truck wheels. Consequently, one motor or set of motors tends to carry the greater portion of the load, and such overloading of these motors usually leads to injurious results, such as over-heating and rapid deterioration of insulating material. To compensate for the recited difference between the various sets of driving motors, it is customary, where phase-advancers are not employed, to insert, in circuit with the secondary winding of one of the motors or sets of motors, a predetermined amount of resistance, whereby the distribution of load between the various motors or sets of motors is maintained substantially constant. However, in systems embodying phase-advancers, the slips of the various motors are varied thereby to effect the desired result which the speed-governing resistors are unable to secure, as more fully set forth later. My present invention is adapted to readily compensate for any differences in wheel diameters and, at the same time, to easily and effectively provide the desired power-factor regulation of the propelling induction motors.

As a means of more clearly setting forth the principles of the foregoing discussion, reference may be had to Fig. 1 of the drawing, wherein the locomotive shown comprises, in general, a cab LC of any familiar type; a plurality of sets of wheels W that are embodied in the respective trucks and are adapted to run along a suitable track T; a plurality of propelling motors $M^1$ and $M^2$ that are adapted to apply energy to the various vehicle wheels by means of suitable driving gearing DG or other well-known mechanism; and a plurality of phase-advancing machines $PA^1$ and $PA^2$ that are adapted to be associated with the propelling motors $M^1$ and $M^2$, as shown in detail in Fig. 2.

Referring now to Fig. 2 of the drawing, the system shown comprises a polyphase supply circuit having phase conductors A, B, and C; the propelling induction motors $M^1$ and $M^2$, respectively having delta-connected primary windings $P^1$ and $P^2$ and delta connected secondary windings having sections $S^{1a}$, $S^{1b}$ and $S^{1c}$, and $S^{2a}$, $S^{2b}$ and $S^{2c}$, respectively; the advancing machines $PA^1$ and $PA^2$ that are associated with the respective induction motors $M^1$ and $M^2$ in a manner to be described; and a plurality of governing translating devices or resistors $LR^1$ and $LR^2$ that are associated with the respective induction-motor secondary windings and the respective phase-advancing machines in a manner to be set forth later.

The primary winding $P^1$ of the induction motor $M^1$ is shown as directly connected, through the agency of suitable trolleys $T^1$, to the supply-circuit conductors A, B and C, while a plurality of suitable conductors D, E and F serve to lead energy from the trolleys $T^1$ to the primary winding $P^2$ of the induction motor $M^2$.

Inasmuch as the sets of propelling motors and the auxiliary apparatus that is associated with them to constitute a complete driving unit, are similar in all respects, only one of the driving units will be described in detail.

Although I have here shown my invention as embodying delta-connected induction motors, it will be understood that the invention is as readily applicable to any other polyphase windings.

The phase-advancer $PA^1$ comprises a suitable drum armature winding (not shown) that is associated with a commutator cylinder 1 in accordance with customary practice; a set of stationary brushes 2, 3 and 4 that are disposed around the commutator cylinder 1 120 degrees apart; a set of rotatably movable brushes 5, 6 and 7 that are also spaced 120 degrees apart; a plurality of compensating field-magnet windings $C^1$, $C^2$ and $C^3$ that are adapted to substantially neutralize the magneto-motive force of the above-mentioned armature winding; and a plurality of main or exciting field-magnet windings $F^1$, $F^2$ and $F^3$. The movable brushes 5, 6 and 7 are shown as mechanically connected to a suitable insulating ring member 8 which is provided with a handle member 9, whereby the brushes may be actuated through the desired range of 180 degrees in accordance with service conditions. It will be understood that any suitable type of operating mechanism for the movable brushes may be employed. Moreover, if desired, the movable brushes may bear upon an auxiliary commutator that is disposed at the rear of the armature and suitably connected thereto, instead of employing the same commutator as the stationary brushes in accordance with the illustration.

It will be understood that any suitable and well-known means for driving the phase-advancer, such as an auxiliary motor driven from the supply circuit, a phase-converter or the vehicle axle, may be employed, and, inasmuch as the particular driving means used forms no material part of my present invention, I have not deemed it necessary to illustrate or describe such means in detail but merely to indicate the same by the driving shafts 13, 13.

The polyphase translating device $LR^1$ is here shown as comprising a liquid rheostat of well-known form, embodying a single containing case 10 and a plurality of properly spaced electrodes or plates 11 that are adapted for variable immersion in a body of suitable electrolyte by means of an appropriate operating member 12 or in any other convenient manner.

The compensating field-magnet winding $C^1$ is disposed to magnetize the phase-advancing machine in alinement with the stationary brush 3 and is connected intermediate the brush 3 and the junction-point of the phase windings $S^{1a}$ and $S^{1b}$ of the secondary winding of the motor $M^1$. Similarly, the field-magnet windings $C^2$ and $C^3$ are electrically associated with the stationary brushes 2 and 4 and with the junction-points of the secondary motor windings $S^{1b}$ and $S^{1c}$ and $S^{1a}$ and $S^{1c}$, respectively.

The exciting field-magnet winding $F^1$ is connected intermediate the movable brush 7 and one of the electrodes 11 of the polyphase translating device $LR^1$, while the remaining exciting field windings $F^2$ and $F^3$ are similarly respectively connected to the brushes 5 and 6 and the remaining electrodes 11 of the device $LR^1$.

The operation of the above-described system will now be set forth. The general speed control of the induction motor may be governed by a main liquid rheostat or other suitable translating device (not shown) of proper capacity, and the motor acceleration may be effected in accordance with familiar principles. As is customary, the phase-advancer should be short-circuited until normal speed conditions are reached and then the phase-advancer should be connected in circuit.

It is well-known that, in systems of the type under consideration, the main governing rheostats referred to above are ineffective after the phase-advancer is set into operation, and, in order to compensate for the hereinbefore-mentioned differences in the various wheel diameters of a locomotive, the field excitation of the phase-advancer may be varied to suitably vary the slips and speeds of the several motors and thereby effect the desired substantially equal distribution of load.

The field excitation of the phase-advancer machine $PA^1$ by the field-magnet windings $F^1$, $F^2$ and $F^3$ is increased in accordance with the operation of the translating device $LR^1$ to correspondingly increase the voltage delivered by the phase-advancer machine as the slip of the motor and the secondary circuit frequency thereof increases, which is necessary to properly compensate for the load and speed changes of the induction motor, as is well understood.

For effecting variation of the phase of the voltage delivered to the secondary windings of the induction motors by the phase-advancing machines, the movable set of brushes may be actuated to a position on the commutator cylinder 1 that corresponds to the operating conditions of the induction motors at the time, whether during propulsion or regeneration, in accordance with the principles hereinbefore set forth.

It will thus be seen that I have provided, in a relatively simple and compact form, means for effectively and reliably regulating the operating speed of a plurality of induction motors or sets thereof to maintain a substantially equal distribution of load between them and to regulate the magnitude and phase of the wattless currents that are induced in the secondary winding circuits for the purpose of power-factor regulation, in accordance with service conditions.

I do not wish to be restricted to the specific arrangement or location of parts and the control-circuit connections hereinbefore set forth, as various modifications thereof may be effected without departing from the spirit and scope of my invention. I desire, therefore, that only such limitations shall be imposed as are indicated in the appended claims.

I claim as my invention:

1. The combination with dynamo-electric machine comprising an armature winding, a commutator cylinder associated therewith, a set of stationary brushes and a set of rotatively movable brushes disposed around said commutator cylinder, a plurality of field windings for neutralizing the magneto-motive force of the armature respectively connected intermediate the secondary windings and the stationary brushes, and a plurality of exciting field windings respectively connected to the movable brushes to derive current from said armature winding, of a polyphase translating device connected to complete the circuits of said exciting field windings, means for varying the resistance of said translating device to vary the terminal voltage of said dynamo-electrical machine, and means for varying the position of said movable brushes to vary the phase of the voltage generated by said dynamo-electric machine.

2. The combination with a polyphase commutator machine including main and auxiliary sets of polyphase brushes and a plurality of exciting field windings, of means for altering the position of said auxiliary brushes, a plurality of adjustable resistors, and connections from said auxiliary brushes through said field windings and resistors, whereby both the phase and magnitude of the excitation of said field windings may be altered.

3. The combination with a dynamo-electric machine of the commutator type provided with main and auxiliary sets of brushes and with an exciting field winding, of means for supplying alternating current to said machine through said main brushes, an adjustable resistor, a connection between two of said auxiliary brushes including said field winding and said resistor, means for rotating said auxiliary brushes around the commutator cylinder and driving means for said dynamo-electric machine.

In testimony whereof, I have hereunto subscribed my name this 30th day of Sept., 1915.

STANLEY G. NOTTAGE.